United States Patent
Perng et al.

(10) Patent No.: US 8,174,385 B2
(45) Date of Patent: May 8, 2012

(54) RADIO FREQUENCY IDENTIFICATION READER HAVING ANTENNAS IN DIFFERENT DIRECTIONS

(75) Inventors: Shin-Yao Perng, Hsinchu (TW); Ta-Yung Lee, Hsinchu (TW); Chia-Chin Yu, Hsinchu (TW); Jun-Ting Shiau, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 854 days.

(21) Appl. No.: 12/240,827

(22) Filed: Sep. 29, 2008

(65) Prior Publication Data
US 2010/0079245 A1 Apr. 1, 2010

(51) Int. Cl.
*G08B 13/14* (2006.01)
(52) U.S. Cl. .................. 340/572.1; 340/572.7
(58) Field of Classification Search ........... 340/572.7, 340/572.1, 10.1; 343/879, 893
See application file for complete search history.

(56) References Cited

U.S. PATENT DOCUMENTS

| | | | |
|---|---|---|---|
| 7,042,413 B2 | 5/2006 | Mazoli et al. | |
| 7,183,922 B2* | 2/2007 | Mendolia et al. | 340/572.1 |
| 7,268,684 B2* | 9/2007 | Tethrake et al. | 340/572.1 |
| 7,535,364 B2* | 5/2009 | Sakama et al. | 340/572.7 |
| 7,804,455 B2* | 9/2010 | Lee et al. | 340/572.7 |
| 7,978,066 B2* | 7/2011 | Lim et al. | 340/572.1 |
| 2006/0044161 A1* | 3/2006 | Feldman et al. | 340/10.1 |
| 2006/0220859 A1* | 10/2006 | Nagai et al. | 340/572.1 |
| 2007/0073513 A1* | 3/2007 | Posamentier | 702/150 |

FOREIGN PATENT DOCUMENTS

| | | |
|---|---|---|
| WO | 2007/047277 A2 | 4/2007 |
| WO | 2007/058620 A1 | 5/2007 |

* cited by examiner

*Primary Examiner* — Thomas Mullen
(74) *Attorney, Agent, or Firm* — Apex Juris, PLLC; Tracy M. Heims

(57) ABSTRACT

A radio frequency identification (RFID) reader includes a plurality of signal antennas, which are respectively arranged in directions that are not parallel to and co-linear with each other. Each of the signal antennas has a predetermined antenna field pattern and operates with a predetermined carrier wave frequency. A wireless receiver is connected to the signal antennas. A signal conversion unit is connected to the wireless receiver. A frequency generator generates the carrier wave frequency to the signal antenna. A microprocessor is connected to the signal conversion unit and the frequency generator.

8 Claims, 5 Drawing Sheets

RADIO FREQUENCY IDENTIFICATION READER HAVING ANTENNAS IN DIFFERENT DIRECTIONS

FIELD OF THE INVENTION

The present invention relates to a design of radiation frequency identification (RFID) reader, and more particularly to a RFID reader equipped with multiple antennas in different directions.

BACKGROUND OF THE INVENTION

A radiation frequency identification (RFID) system comprises a RFID reader and a RFID tag. Data contained in the RFID tag is transmitted via radio frequency signals to the RFID reader. Power is transmitted, also via the radio frequency signals, to the RFID tag so that the RFID tag can operate without a built-in battery-based power source.

The reliability of an RFID system is affected by antennas of the RFID tag and the RFID reader. An electrical current flowing through the antenna generates an electromagnetic pulse that radiates outward with the speed of light. A direction of the radiation electric field (referred to as direction of polarization) is normal to the propagation direction of wave front of the electromagnetic wave. The radiation electric field is only affected by two parameters, one being the distance, wherein the magnitude of the radiation electric field is in inverse proportion to the distance, and the other being direction or orientation angle, wherein a relationship between the angle and the radiation electric field is referred to as an antenna field pattern. The magnitude of the radiation electric field varies with the direction or orientation angle of the antenna field pattern. This causes a problems associated with directionality in signal transmission between the RFID reader and a RFID tag. Further, once the antenna of the RFID tag is orientated orthogonal to the antenna of the RFID reader, signal reception or power reception may be not available. In a practical application, the location of the RFID tag may be constantly changed, and so is the orientation thereof. This often leads to a problem associated with the included angle as discussed above, making the performance of RFID tag reading extremely poor.

U.S. Pat. No. 7,042,413 provides a RFID tag that is made of a flat stock to form a three-dimensional antenna array. The tag has a first dipole antenna and a second dipole antenna, which are not parallel to each other and do not intersect each other so as to define a plane. A third dipole antenna is set in an outward projecting direction of the plane. Although this US patent forms a tag by cutting a flat stock to provide a three-dimensional antenna array, which eliminates the angle problem of signal reception by the tag, yet altering the antenna arrangement of the tag does not overcome the problem caused by the distribution of the radiation electric field in different directions or orientation angles of the antenna field pattern of the antenna of the reader and signal transmission is certain directions may still be not available.

SUMMARY OF THE INVENTION

In the known techniques, an RFID reader has an antenna that provides an antenna field pattern having a variable distribution of a radiation electric field in different directions, leading to dead spots of signal transmission and poor reception at sites where the radiation electric field is weak. In case that an included angle between the antenna of the RFID reader is normal to the antenna of a RFID tag becomes a right angle, it is very likely that no signal transmission or reception is available no matter how close is the RFID tag to the RFID reader and the correlation between signal magnitude and distance becomes poor, making it no longer possible to perform RFID tag location identification through signal magnitude, thereby leading to poor applicability thereof. Further, in different applications, such as industrial or commercial applications, there may exist various electromagnetic interferences, which cause noises in signal transmission and reception.

In view of the above discussed limitations and technique problems of the known techniques, the present invention attempts to provide an RFID reader having antennas in different directions, which provides an arrangement of multiple antennas arranged in different directions so that transmission and reception can be carried out correctly without any dead spots regardless of the relative orientation between the RFID reader antenna and the RFID tag antenna, whereby signal can be transmitted and received in all directions in the space.

The present invention provides an RFID reader that comprises a plurality of signal antennas respectively arranged in directions that are not parallel to and co-linear with each other. Each signal antenna has a predetermined antenna field pattern and operates with a predetermined carrier wave frequency. A microprocessor is coupled, sequentially via a signal conversion unit and a wireless receiver, to the signal antennas, and is also connected to the wireless receiver via a frequency generator. The microprocessor is further coupled to a memory unit, which contains therein a RFID tag identification code database.

With the arrangement of signal antennas in different directions in accordance with the present invention, the direction having weak radiation electric field in the antenna field pattern of each signal antenna can be covered by a strong portion of the radiation electric field in the antenna field pattern of another signal antenna, whereby when the plurality of signal antennas is used simultaneously, the radiation electric field of a combined antenna field pattern can have an expanded range and provides a substantial distribution in all directions. When an RFID tag is located in a direction of one of the signal antennas that has a poor performance of signal reception, the RFID reader will be just in a direction of another one of the signal antennas that has an excellent performance of signal reception. Thus, excellent signal transmission and reception can be realized regardless how the RFID tag is moved.

Since the signal antennas are arranged in different directions, any problems caused due to the included angle between the RFID reader antenna and the RFID tag antenna can be eliminated. In an embodiment of the present invention, all the signal antennas of an RFID reader are set in mutually perpendicular directions, whereby when one of the signal antennas of the RFID reader is orientated orthogonal to the RFID tag antenna, although the performance of signal transmission and reception of the signal antenna that is orthogonal to the RFID tag antenna becomes poor, at least one of the remaining signal antennas of the RFID reader is not orientated orthogonal to the RFID tag antenna and provides better transmission and reception. Thus, due to the mutual compensation among the plurality of signal antennas provided to the RFID reader, the RFID reader is capable to always maintain excellent transmission and reception of signals.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
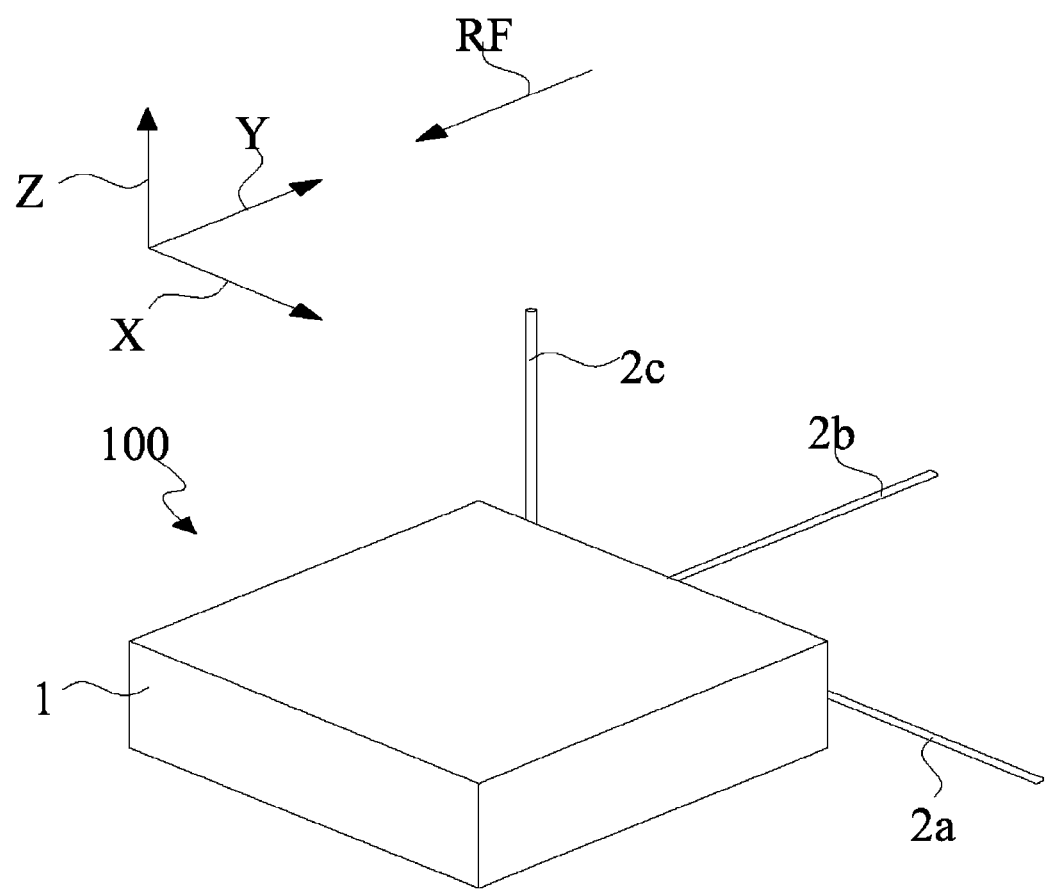
FIG. 1 illustrates a perspective view of an RFID (Radio Frequency Identification) reader having antennas in different directions constructed in accordance with a first embodiment of the present invention.

With reference to the drawings and in particular to FIG. 1, which shows a perspective view of an RFID (Radio Frequency Identification) reader having antennas in different directions constructed in accordance with a first embodiment of the present invention, the RFID reader of the present invention, generally designated at 100, comprises a casing 1, a first signal antenna 2a, a second signal antenna 2b, and a third signal antenna 2c. The first signal antenna 2a, the second signal antenna 2b, and the third signal antenna 2c are arranged in mutually normal directions defined by X-, Y-, and Z-axis in a space and each of the antennas has a predetermined antenna field pattern operating with a carrier wave of a predetermined frequency f. Although the first signal antenna 2a, the second signal antenna 2b, and the third signal antenna 2c are arranged in the directions of X-, Y-, and Z-axis that are normal to each other in the first embodiment of the present invention, they can be arranged in directions that are not mutually normal to each other and/or not co-linear with each other in space to meet the requirements desired by a user or imposed by the environments.

In case a radio frequency signal RF is coming toward the RFID reader 100, when the radio frequency signal RF is substantially perpendicular to the X-axis direction of the first signal antenna 2a and the Z-axis direction of the third signal antenna 2c, the signal reception by the first signal antenna 2a and the third signal antenna 2c will be poor, or even no signal is received at all. Due to the specific spatial orientation of the second signal antenna 2b, which in this case sets the second signal antenna 2b substantially parallel to the radio frequency signal RF, the second signal antenna 2b provides the best signal reception in this case.

Figure 2:
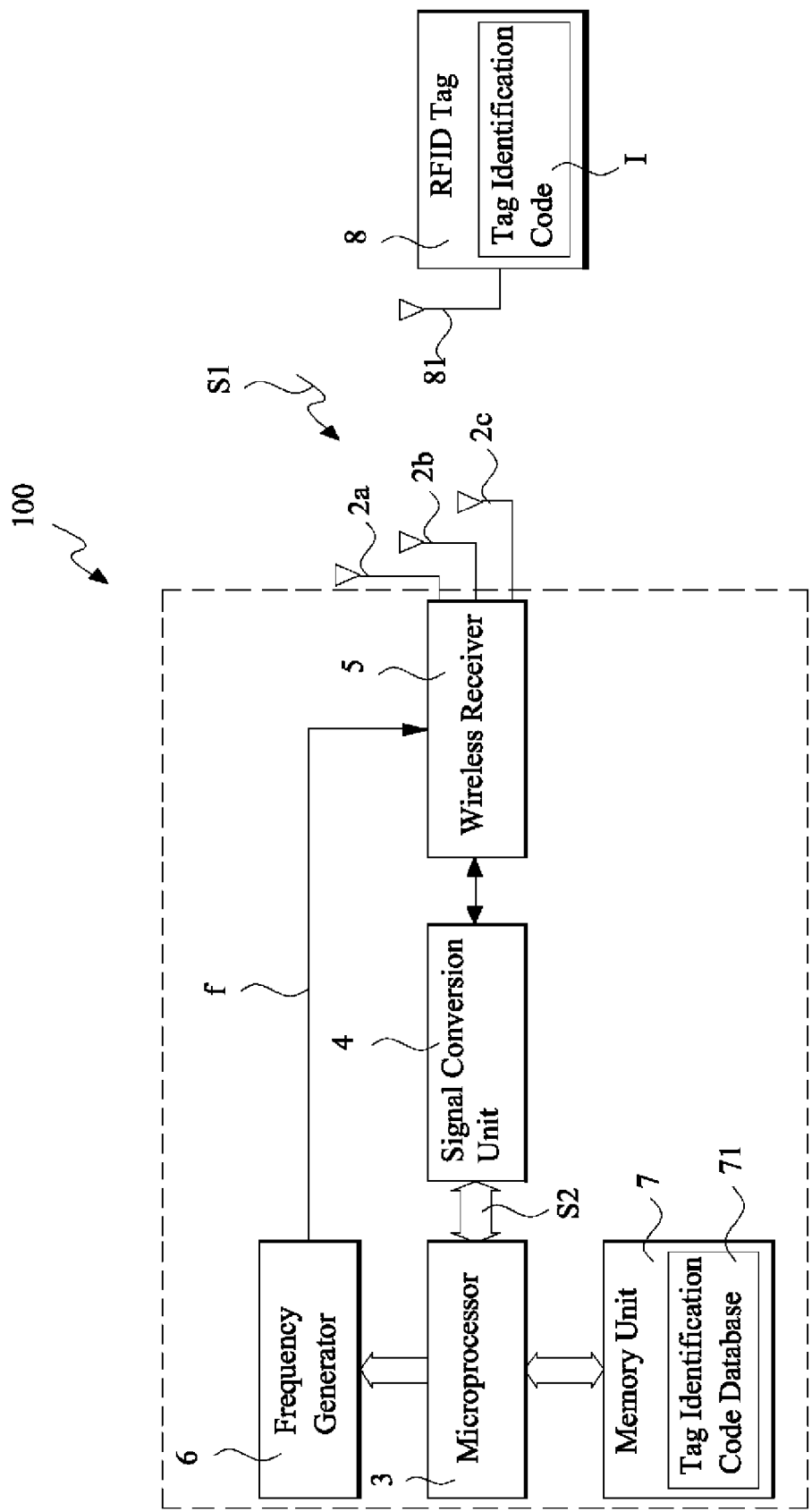
FIG. 2 is a block diagram of a control circuit constructed in accordance with the first embodiment of the present invention.

Referring to FIG. 2, which shows a block diagram of a control circuit constructed in accordance with the first embodiment of the present invention, the control circuit of the first embodiment of the present invention comprises a microprocessor 3, which is coupled to the first signal antenna 2a, the second signal antenna 2b, and the third signal antenna 2c sequentially via a signal conversion unit 4 and a wireless receiver 5 and is also coupled, via a frequency generator 6, to the wireless receiver 5 so as to control the frequency generator 6 to generates the carrier wave frequency f to the first signal antenna 2a, the second signal antenna 2b, and the third signal antenna 2c. The microprocessor 3 is further coupled to a memory unit 7, which contains therein a tag identification code database 71.

When an RFID tag 8 transmits, through a tag antenna 81 thereof, an identification signal S1 to the RFID reader 100, the wireless receiver 5 receives the identification signal S1 through first signal antenna 2a, the second signal antenna 2b, and the third signal antenna 2c, and applies the received identification signal S1 to the signal conversion unit 4. The signal conversion unit 4 then converts the received identification signal S1 into a digital identification signal S2, which is applied to the microprocessor 3. The microprocessor 3 bases on the digital identification signal S2 to determine a tag identification code I of the RFID tag 8 and stores the tag identification code I in the tag identification code database 71 of the memory unit 7 for subsequent use.

Figure 3:
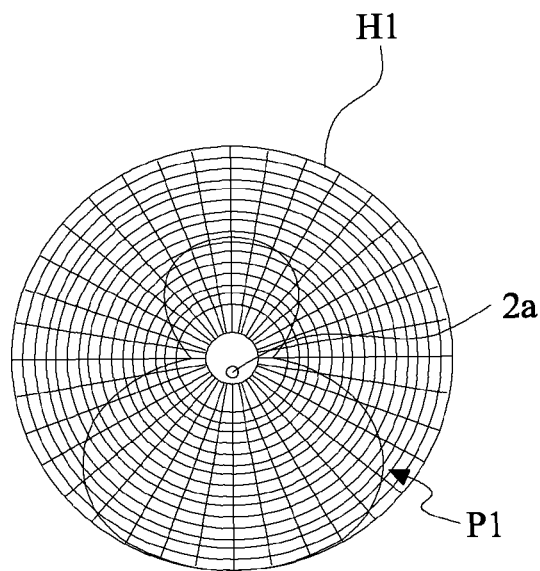
FIG. 3 is a schematic view of an antenna field pattern of a first signal antenna of the first embodiment in accordance with the present invention.

Referring to FIG. 3, which shows a schematic view of an antenna field pattern of the first signal antenna of the first embodiment in accordance with the present invention, the first signal antenna 2a has an antenna field pattern P1, which provides various magnitudes of the radiation electric field in different directions on an antenna field pattern plane H1. A weaker radiation electric field in the antenna field pattern P1 indicates a poorer signal reception direction, which can be even a dead spot of telecommunication or signal transmission.

Figure 4:
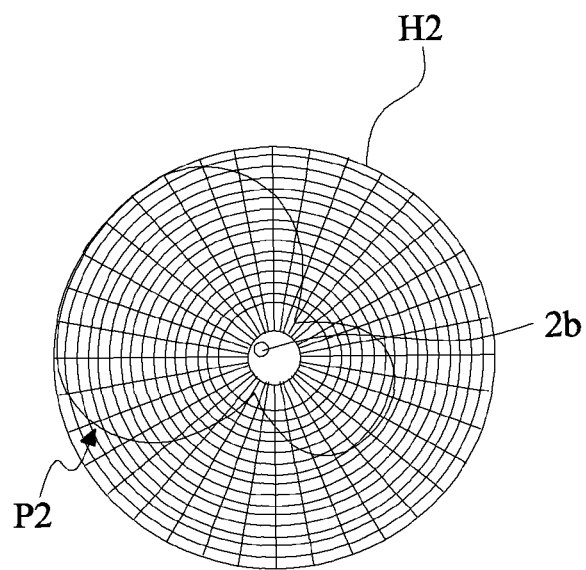
FIG. 4 is a schematic view of an antenna field pattern of a second signal antenna of the first embodiment in accordance with the present invention.
Figure 5:
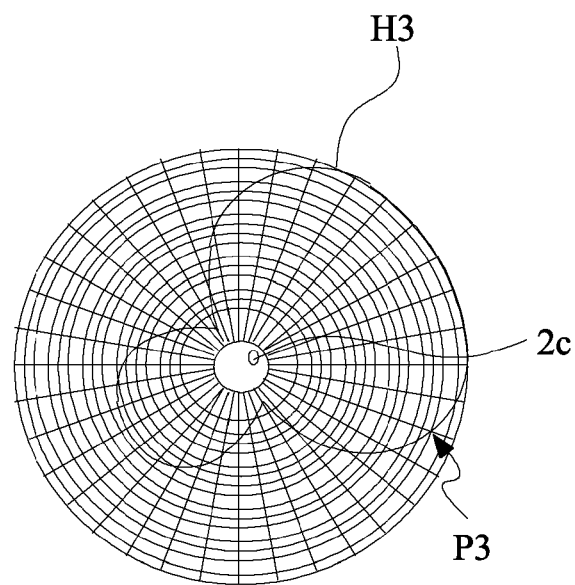
FIG. 5 is a schematic view of an antenna field pattern of a third signal antenna of the first embodiment in accordance with the present invention.

Referring to FIGS. 4 and 5, which respectively show schematic views of antenna field patterns of the second and third signal antennas of the first embodiment in accordance with the present invention, compared to the antenna field pattern P1 of the first signal antenna 2a, although the antenna field pattern P2 of the second signal antenna 2b and the antenna field pattern P3 of the third signal antenna 2c are of shapes substantially identical to that of the antenna field pattern P1, since the second signal antenna 2b and the third signal antenna 2c are set in the Y- and Z-axis directions that are different from the X-axis direction of the first signal antenna 2a, the antenna field patterns P2, P3 of the second and third signal antennas 2b, 2c are of differential spatial distribution on respective antenna field pattern planes H2 and H3 thereof.

Figure 6:
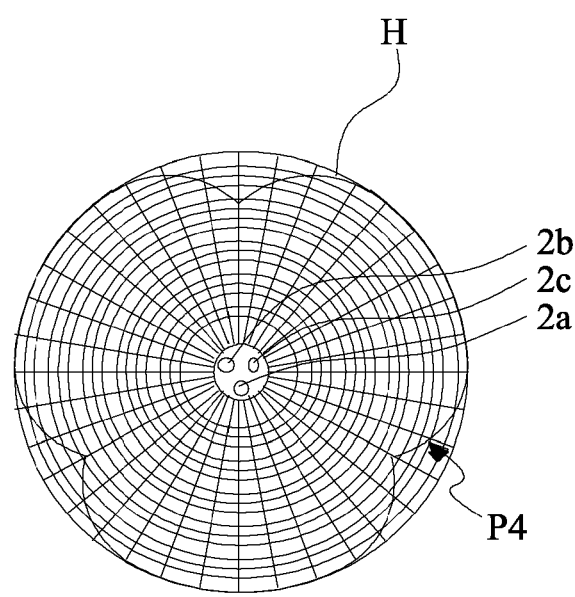
FIG. 6 is a schematic view of an antenna field pattern obtained when the first, second, and third signal antennas of the first embodiment of the present invention are simultaneously used.

Referring to FIG. 6, which shows a schematic view of an antenna field pattern obtained when the various signal antennas of the first embodiment of the present invention are simultaneously used, when the first signal antenna 2a, the second signal antenna 2b, and the third signal antenna 2c are simultaneously used, the spatial portions of the antenna field patterns P1, P2, P3 that are originally of weak radiation electric field in each individual antenna field pattern plane are covered by portions of other antenna field patterns P1, P2, P3 that are of strong radiation electric field, whereby a combined and substantially uniformly distributed antenna field pattern P4 is obtained on an antenna field pattern plane H, which provides excellent radiation electric field in all directions. Although, in the first embodiment of the present invention, it only illustrates the radiation electric field of the individual and combined antenna field patterns P1, P2, P3, P4 distributed in the respective antenna field pattern planes H1, H2, H3, H, it can be inferred that the combined antenna field pattern P4 is also of a substantially uniform distribution in all directions in a three-dimensional space, leaving no dead spot at all in the space.

Figure 7:
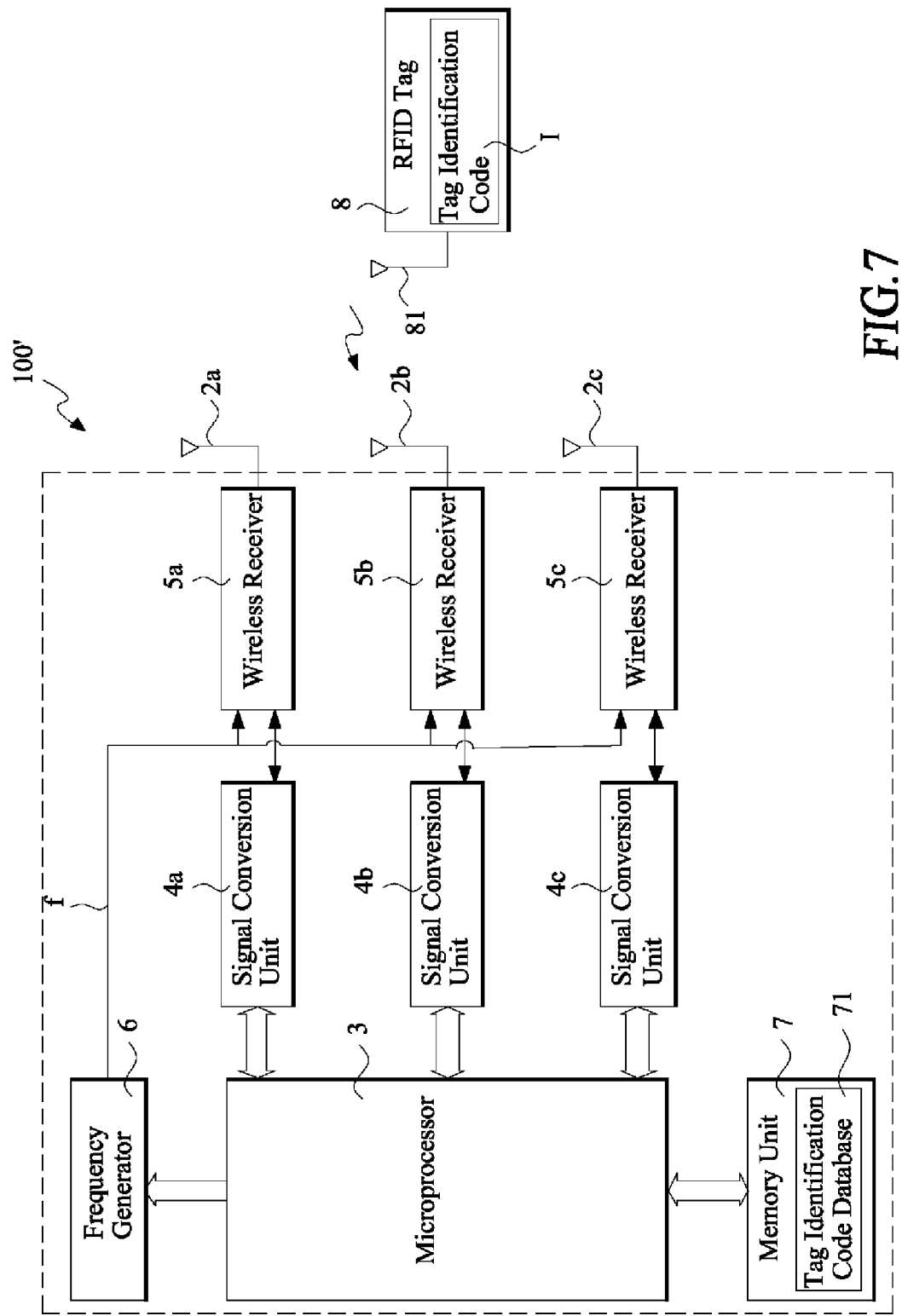
FIG. 7 is a block diagram of a control circuit in accordance with a second embodiment of the present invention.

Referring to FIG. 7, which shows a block diagram of a control circuit in accordance with a second embodiment of the present invention, an RFID reader in accordance with the second embodiment, generally designated at 100' for distinction, comprises a control circuit that is similar to that of the RFID reader 100 of the first embodiment, and similar or identical parts bear the same reference numerals for simplicity and mutual reference. A difference of the RFID reader 100' of the second embodiment from the RFID reader 100 of the first embodiment resides in that the second-embodiment RFID reader 100' comprises a microprocessor 3 that are coupled to first, second, and third antennas 2a, 2b, 2c respectively and sequentially via signal conversion units 4a, 4b, 4c and wireless receivers 5a, 5b, 5c. Further, the microprocessor 3 is also coupled, via a frequency generator 6, to each wireless receiver 5a, 5b, 5c so as to control the frequency generator 6 to generate a carrier wave frequency f for the first, second, and third signal antennas 2a, 2b, 2c. The microprocessor 3 is also coupled to a memory unit 7, which contains a tag identification code database 71.

Individually connecting the first, second, and third signal antennas 2a, 2b, 2c, which can be modularized devices, to respective signal conversion units 4a, 4b, 4c and respective wireless receiver 5a, 5b, 5c allows the reception of signal or data to be no longer carried out by a single device. This reduces the load of data processing and may also provide a potential construction for other applications, such as providing multi-frequency-band reception and mating with multiple RFID tags.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A radio frequency identification (RFID) reader adapted to receive an identification signal transmitted from an RFID tag for determining a tag identification code of the RFID tag based on the identification signal, the RFID reader comprising:
   a plurality of signal antennas, which are respectively arranged in directions that are not parallel to each other and are not co-linear with each other, each of the signal antennas having a predetermined antenna field pattern and operating with a predetermined carrier wave frequency;
   a wireless receiver, which is connected to the signal antennas to receive the identification signal from the RFID tag via the signal antennas;
   a signal conversion unit, which is connected to the wireless receiver to convert the received identification signal into a digital identification signal;
   a frequency generator, which generates the carrier wave frequency to the signal antennas via the wireless receiver; and
   a microprocessor, which is connected to the signal conversion unit and the frequency generator for controlling the frequency generator to generate the carrier wave frequency and for the determination of the tag identification code of the RFID tag based on the digital identification signal.

2. The RFID reader as claimed in claim 1, wherein the microprocessor is further coupled to a memory unit, which contains therein a tag identification code database.

3. The RFID reader as claimed in claim 1, wherein the signal antennas selectively comprise uni-pole antennas and dipole antennas.

4. The RFID reader as claimed in claim 1, wherein the signal antennas comprise an X-axis signal antenna, a Y-axis signal antenna, and a Z-axis antenna that are substantially normal to each other.

5. A radio frequency identification (RFID) reader adapted to receive an identification signal transmitted from an RFID tag for determining a tag identification code of the RFID tag based on the identification signal, the RFID reader comprising:
   a plurality of signal antennas, which are respectively arranged in directions that are not parallel to and not co-linear with each other, each of the signal antennas having a predetermined antenna field pattern and operating with a predetermined carrier wave frequency;
   a plurality of wireless receivers, which are respectively connected to the signal antennas to receive the identification signal from the RFID tag via the respective signal antennas;
   a plurality of signal conversion units, which are respectively connected to the wireless receivers to convert the received identification signal into a digital identification signal;
   a frequency generator, which generates the carrier wave frequency to each of the signal antennas via the wireless receivers; and
   a microprocessor, which is connected to the signal conversion units and the frequency generator for controlling the frequency generator to generate the carrier wave frequency and for the determination of the tag identification code of the RFID tag based on the digital identification signal.

6. The RFID reader as claimed in claim 5, wherein the microprocessor is further coupled to a memory unit, which contains therein a tag identification code database.

7. The RFID reader as claimed in claim 5, wherein the signal antennas selectively comprise uni-pole antennas and dipole antennas.

8. The RFID reader as claimed in claim 5, wherein the signal antennas comprise an X-axis signal antenna, a Y-axis signal antenna, and a Z-axis antenna that are substantially normal to each other.

* * * * *